Aug. 31, 1943.  W. S. GUBELMANN  2,328,272
CASH REGISTER
Original Filed Jan. 22, 1929    10 Sheets-Sheet 1

INVENTOR
WILLIAM S. GUBELMANN
BY
ATTORNEYS

INVENTOR
WILLIAM S. GUBELMANN
BY
ATTORNEY

Aug. 31, 1943.  W. S. GUBELMANN  2,328,272
CASH REGISTER
Original Filed Jan. 22, 1929  10 Sheets-Sheet 3

INVENTOR
WILLIAM S. GUBELMANN
BY
ATTORNEYS

Aug. 31, 1943.  W. S. GUBELMANN  2,328,272
CASH REGISTER
Original Filed Jan. 22, 1929   10 Sheets-Sheet 4
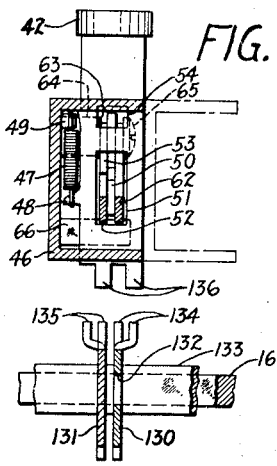
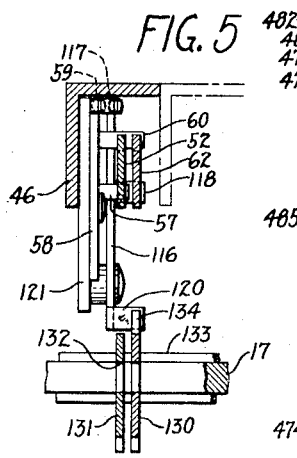
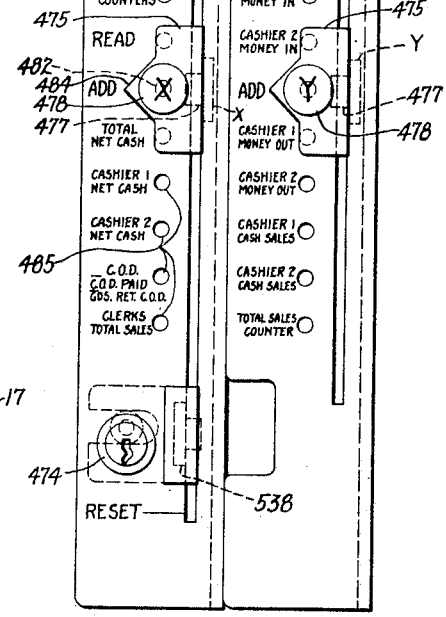
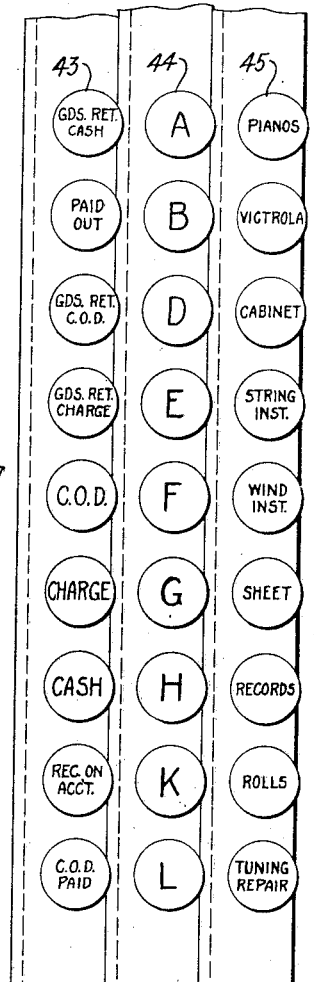
INVENTOR
WILLIAM S. GUBELMANN
BY
ATTORNEYS Aug. 31, 1943.  W. S. GUBELMANN  2,328,272
CASH REGISTER
Original Filed Jan. 22, 1929  10 Sheets-Sheet 5

INVENTOR
WILLIAM S. GUBELMANN
BY
ATTORNEYS

Aug. 31, 1943.  W. S. GUBELMANN  2,328,272
CASH REGISTER
Original Filed Jan. 22, 1929    10 Sheets-Sheet 7
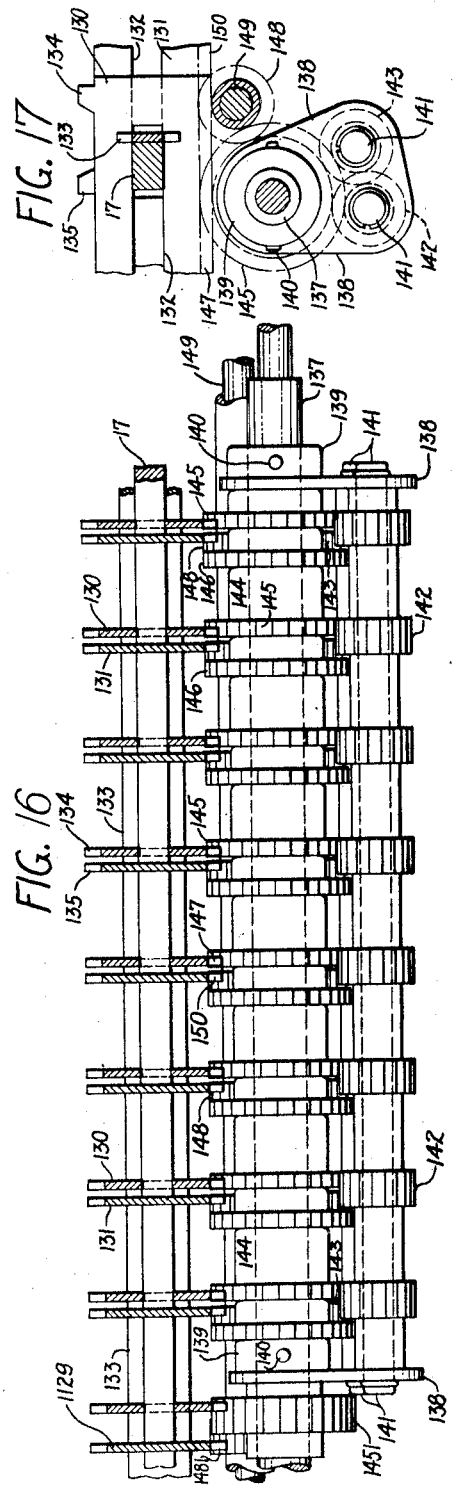
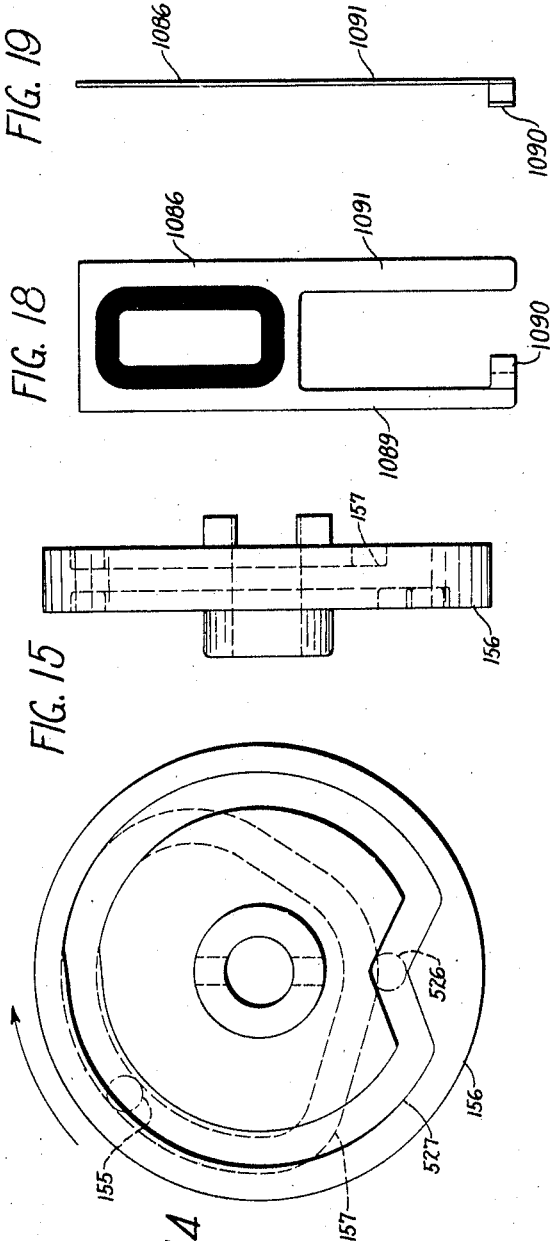
INVENTOR
WILLIAM S. GUBELMANN
BY
ATTORNEYS

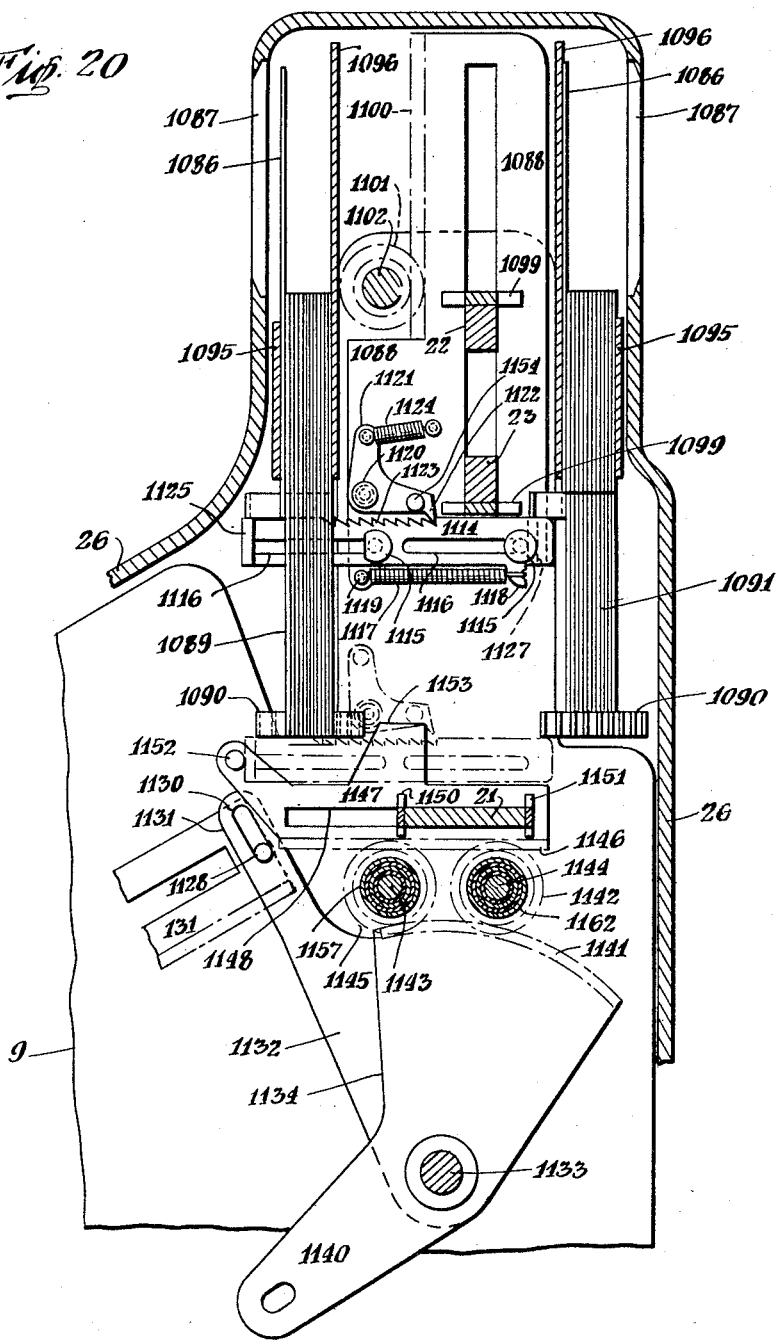

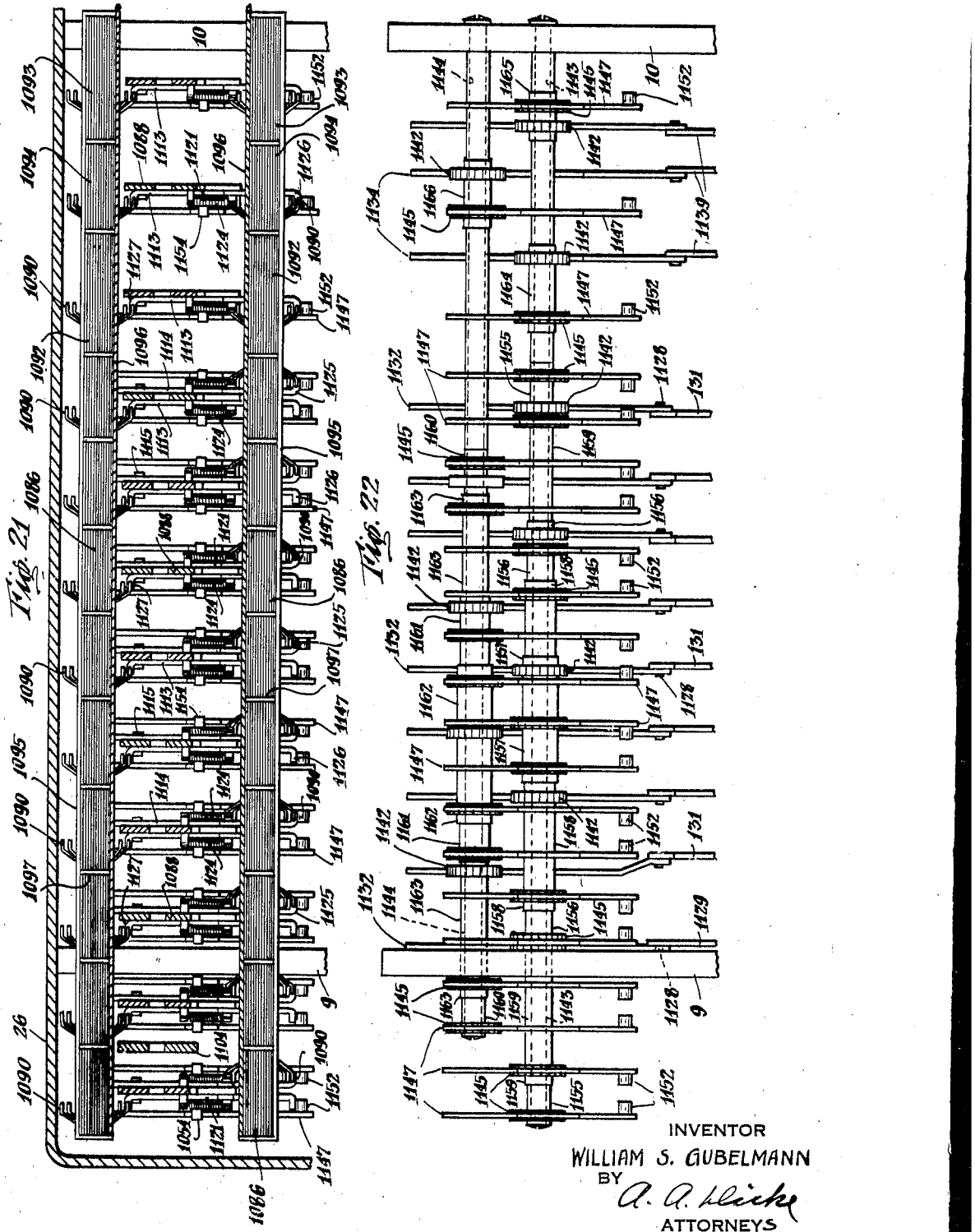

Patented Aug. 31, 1943

2,328,272

UNITED STATES PATENT OFFICE 2,328,272

CASH REGISTER

William S. Gubelmann, Convent, N. J.

Original application January 22, 1929, Serial No. 334,160, now Patent No. 2,226,919, dated December 31, 1940. Divided and this application June 11, 1940, Serial No. 339,953

3 Claims. (Cl. 235—23)

This invention relates to cash registers and particularly to indicating mechanism for such machines, this application being a division of applicant's application S. N. 334,160 filed January 22, 1929, Patent 2,226,919, December 31, 1940.

A primary object of the present invention is to improve the mechanism which is adapted to indicate the various items which are entered in the machine, as well as the totals of these items. While the present invention may be employed with various types of cash registers and any other machines in which indication is useful it has been illustrated as applied to the machine forming the illustrative embodiment of the invention of said application S. N. 334,160 to which reference is made for a more complete understanding of the machine as a whole.

It is thus an object of the invention to provide a novel form of indicating mechanism for said and other machines, which may include means for indicating amounts entered into the machine and characters designating the various special keys operated, which for the sake of example may represent transactions, departments and clerks. It is also capable during totaling operations of indicating the amounts of totals standing on either the totalizers or the item counters, and if the totalizer or counter involved is one directly related to a single special key, the designating character for that key will also be indicated.

By the use of a very thin form of indicator tablet it has been found possible to provide a very complete indication which is clearly visible from all angles and at a considerable distance. It is rendered comparatively free from excessive casting of shadows without the necessity of moving an entire series of tablets from front to rear of the machine as is frequently required in constructions of the prior art. In accordance with the present invention, it has been found possible to select an indicator for exposure by a relatively small movement of a small slide which is carried by an indicator lifting frame that is in turn connected to the operating mechanism. A feature of the lifting mechanism for exposing selected indicators is the arrangement which substantially eliminates the noise usually incident to the dropping of indicators. For this purpose the lifting means holds the indicators elevated when the machine is idle or between operations and it serves to restore them gradually at the beginning of a new operation. The connections from the amount key banks to the small selecting slides carried by the lifting frames are somewhat different from the corresponding connections from the special key banks; the novel features of each will be made apparent from the detailed description to be given hereinafter.

While an attempt has been made in the foregoing to enumerate a number of the outstanding improved and novel features embodied in the indicating mechanism of the present invention, it will be understood that many other features, too numerous to specifically mention at this point, are present and will become more apparent as the description of the illustrative machine progresses.

General outline of illustrative machine

In order that the relation between the various parts, which will be described hereinafter in detail, may be more readily understood a general outline will first be given of the component parts of the machine illustrated in the drawings. While this machine serves admirably to illustrate the important features of the invention it will be understood that the specific application of these features herein given is not intended to be restrictive but various modifications may be made to adapt the machine for innumerable other uses.

It has been found convenient for the purpose of explaining the extreme flexibility in application of the novel features of the invention to disclose them in connection with a machine adapted for use in a large musical instrument store which handles not only a variety of such instruments but a number of accessory items as well. It will be assumed that such a store is divided into a number of departments which may themselves be assigned to one of two groups as for example an instrument group and a miscellaneous group including accessories or miscellaneous items, such as sheet music, player rolls, phonograph records, and repairs. The instrument group may embrace such departments as piano, wind instrument, string instrument, phonograph, and so on.

Each department may have assigned to it a number of clerks although for the sake of avoiding duplication of parts in the disclosure only one clerk will be assumed to be associated with each department. The store may be of such size and conduct its business in such a way that a wide variety of transactions are encountered such as the usual cash, charge, paid out, received on account, and C. O. D. transactions. These types of transactions will necessitate extreme flexibility in the printing feature of the machine in order to enable its coordination with a suitable bookkeeping system.

As intimated in the foregoing the present machine is intended to be operated by either of a pair of cashiers who may be responsible for all transactions occurring during their respective terms of duty. Each cashier, furthermore, may be enabled to control certain identifying and totalizing devices related only to himself in such a way as to prevent any one else from using these devices to produce a false or erroneous entry.

In order that instantaneous totals may be obtainable of a wide variety of items a large number of totalizers are provided and these are related not only to the individual keys assigned to the department, clerks and transactions, but are related as well to combinations of these classes. Thus, for the nine departments, nine clerks, and nine transactions, there are provided twenty-seven totalizers arranged in three groups or banks, each containing the nine falling under a particular classification. Each of these groups are shown provided with what may be termed a universal carrying mechanism which has certain parts common to all of the nine totalizers in the group. In addition each of these three banks of totalizers includes a tenth totalizer which is adapted to carry the grand total of the amounts on all of the nine universal type of totalizers in the group, or if desired it may carry some entirely independent total. These grand totalizers are provided with what may be termed individual carrying mechanism since each must be capable of operation without regard to any other totalizer. Those totalizers related to the departments and the clerks are adapted in the present disclosure to accumulate only those transactions which represent actual sales, that is, cash, charge, and C. O. D. items, while the transaction group of totalizers will of course accumulate all items of each particular type of transaction. Since the grand total of the clerk's group of totalizers will be the same as the grand total of the department totalizers under the arrangement assumed above only one of the individual totalizers will be used for this purpose. The remaining individual totalizer associated with these groups has, in the illustrative machine, been assigned to one of the cashiers to accumulate the total sales registered by him. Similarly, the second cashier's sales will be entered upon the individual totalizer of the transaction group, since a grand total of all transactions would be meaningless.

A fourth group of totalizers is provided in the machine and this group is of such construction that as many of the totalizers in the group as desired may be operated at the same time. Thus in the group illustrated there are eight totalizers all of which might be operated during an operation of the machine if occasion required it since the transfer mechanisms, while provided with certain common operating devices, are sufficiently independent to permit the proper action for each individual totalizer of the group. In the particular layout adopted for illustration these totalizers are devoted to such items as the total sales registered in each of the two groups of departments, the money taken in by each cashier, the money paid out by each cashier, and the cash sales registered by each cashier. From these designations it will be seen that it will not actually be necessary to operate more than two or at most three of these units upon a single operation of the machine. It will be apparent that the determination as to whether any one of these totalizers shall be rendered effective upon a particular operation is dependent upon the particular keys operated either in the department or the transaction banks as well as upon the state of the pair of cashiers' locks.

A fifth bank of totalizers is further provided for the purpose of handling such combinations of items as may require both addition and subtraction. This bank, as shown, is made to include four totalizers, one of which is devoted to the total cash on hand, while two others are devoted to the cash for which each cashier is to be held responsible, and the fourth is devoted to "C. O. D." items in such a way as to indicate at all times the amount of "C. O. D" business for which collections have not been made. The first of this group of totalizers will be so arranged and operated that it will receive as positive entries all "cash," "received on account," and "C. O. D. paid" amounts, while it will receive as negative or subtractive entries all "paid out" amounts. The selection of this totalizer for effective operation will therefore be dependent upon the particular transaction key depressed and if this key renders the totalizer effective it must at the same time determine its state, that is as to whether it is to be operated additively or subtractively. Substantially the same mode of control must be provided for the two totalizers devoted to the cash of the individual cashiers with the additional requirement that the selection of these totalizers must also be governed by the cashiers' locks. The remaining totalizer of this group will of course be rendered active only when one of the three C. O. D. keys happens to be depressed. Thus if the ordinary C. O. D. key is depressed this totalizer will be selected for additive operation whereas if the "C. O. D. paid" key or the "goods returned C. O. D." key is depressed the selection of this totalizer will be for subtractive operation. From what has been said it may be noted that as to this fifth bank of totalizers it may be necessary under certain conditions to operate one of them additively and at the same time operate another of them subtractively to the same extent. Thus when a "C. O. D. paid" amount is reported and registered it must be added to the general cash totalizer as well as to one of the cashiers' cash totalizers but it must at the same time be subtracted from the C. O. D. totalizer in order that the latter may represent only outstanding items of this character.

In addition to the foregoing banks of totalizers capable of receiving the variable amounts of the various transactions and some of them either additively or subtractively the machine illustrated is provided with some thirty item counters which are arranged in three banks and are adapted to receive only unitary actuation upon operations of the machine. These counters are of substantially the same construction as the totalizers of the first three banks mentioned but, as stated, are adapted to receive only unit actuation upon operations of the machine. Twenty-seven of these counters are of the universal carry type and are directly related to corresponding ones of the keys in the three special key banks so that upon normal operations three counters will have a unit added to their registrations. The remaining three counters which are of the individual transfer construction are devoted to the counting of the total number of operations performed by each cashier and the counting of the number of sales made by all of the clerks.

From the foregoing brief outline of the general character of the totalizers and item counters provided in the machine illustrated herein, it will be found that this machine is capable of operating a maximum of eighteen totalizers and six item counters upon a single operation of the machine although due to the particular designation assigned to the totalizers and counters the actual number which will be selected during any normal operation will probably not exceed ten totalizers and five counters.

From time to time it may be desired to print and indicate the totals standing upon one or another or possibly all of the totalizers either with or without resetting. For this purpose certain lock controlled devices are provided through the adjustment of which it is made possible for an authorized person to condition the machine for the printing and indicating of totals from any of the totalizers and the returning of the same amounts to the wheels, i. e., sub-totaling, while the same person or another specially delegated party may so condition the machine as to effect the resetting of the totalizers coincidently with the printing and indicating of totals. Now since there are a large number of totalizers provided in the illustrative machine for which there are no single selecting keys and which are engaged with the actuators under the joint control of a plurality of keys it has been found necessary or desirable to provide a plurality of total printing and indicating controlling levers each of which may be moved to any one of several totaling positions. These levers are normally locked, but when the manager of the store, for example, releases them by the use of a special removable key they may be moved to any desired position. Now for the three banks of what have been termed the universal totalizers, comprising twenty-seven in all, the selection of any one for totaling may be aided by the depression of the corresponding key in one of the three special banks, just as for item entering operations. The invention, therefore, contemplates the movement of one of the totaling levers to a certain position, which is one step removed from the normal adding position, and in which any one of the twenty-seven universal totalizers may be selected for sub-totaling by depression of the related key. A similar arrangement is made possible with respect to the twenty-seven item counters having the universal transfer construction, but in order to distinguish between the totalizer and the item counter related to a particular key during total taking there is provided a separate position of the same total lever for item counter totals. This position may, for example, be two steps away from normal. However, this arrangement alone does not take care of the three individual transfer type of totalizers located one in each of the three banks discussed above nor the three individual transfer item counters. Separate positions of the same total lever are accordingly provided for determining the selection of each of these individual totalizers during totaling. This control is necessarily without the aid of any special keys since no keys correspond directly to these totalizers. Substantially the same construction is provided for that item counter which represents a grand total of the number of all sales entered, the only difference being that a definite position of the other total lever is provided for this purpose. As for the remaining individual transfer item counters the aid of the cashiers' locks may be relied upon to effect a selection so that the total lever first mentioned is merely placed in the second position specified and the appropriate cashier's lock turned.

For the remaining twelve totalizers, namely the bank of eight individual transfer totalizers and the four adding and subtracting totalizers, there must be provided four additional positions for the first mentioned lever, as well as some eight positions other than the normal and "total sales counter" positions of the second lever. By the arrangement specified it is thus made possible to select for total printing and indicating any one of the forty-two totalizers or of the thirty item counters by the selective movement of one of two levers to one of nine positions away from normal, the selection of certain of the totalizers and counters being aided by the depression of certain keys or the turning of the cashiers' locks.

The resetting control is precisely the same for all totalizers and is effected by the mere turning of a lock in addition to the appropriate adjustment of the lever mentioned. Thus, in order to condition the machine for a reset or grand total operation it is necessary that the party operating the machine should have not only the key to unlock the pair of adjustable levers but a special key to turn the resetting control lock.

One feature of the invention which should probably be mentioned at this point is the general mode of operation of the differential mechanism. During normal adding operations this mechanism is entirely positive in its action and is of the type involving complementally movable elements which move in opposite directions until a shoulder on each engages a stop set by the depressed key in the particular bank involved. During totaling operations it has been found desirable to introduce a spring for operating that one of the complemental elements for each bank which is connected at the time through gearing to the totalizer actuator. On operations of this kind it is desired to have the totalizer elements, in being turned back to zero positions, to control the extent of movement of the actuators and hence the complemental elements. For this reason, the special springs are rendered effective for totaling to insure the movement of the actuators and connected ones of the complemental members prior to any movement of the remaining complemental members; in this way the latter will then subsequently be shifted, after the totalizer wheels have reached zero, to take up the balance of the full complement which each pair of members must receive. Since the type carriers and indicating mechanism are therefore positioned under only spring control in totaling, certain precautionary devices have been provided to lock up the machine in the event of any interference with the free movement of the type carriers through tampering as by the insertion of a wire.

An important phase of the machine is the provision of suitable machine release and key interlocking devices. The arrangement adopted for purposes of illustration contemplates compelling the operation of a key in each of the special key banks as well as the turning of one of the cashiers' locks into active position as an incident to the operation of the machine. Four separate locking arms are therefore provided to normally block the operation of the main shaft. However, when totals are being taken from any of the twenty-seven totalizers of the universal transfer type, or when totaling from the corresponding item counters, the machine should be releasable by the depression of a single key. Furthermore, it should be impossible at such times to depress more than a single key. To this end the movement of one of the total control levers to the position wherein it predetermines either of the two conditions mentioned it automatically serves to couple up the four locking arms in such a way that movement of one will cause releasing movement of all four. Again, when the machine is conditioned for taking totals from other totalizers or counters which are not directly related to one of the special keys or a cashier's lock the machine should be releasable without the need of depressing any key or the turning of either of the cashiers' locks. To this end movement of either of the total controlling levers to any position, other than the two above specified, away from normal is adapted to automatically withdraw all of the four locking arms mentioned so that the machine may be operated directly or may be released by a motor bus bar.

In addition to the foregoing machine locking and releasing mechanisms there are provided interlocking means which prevent movement away from normal of more than one of the total control levers at a time; there are also means for preventing depression of more than a single key in any bank and means for compelling proper coordination between the total levers and special keys for all positions of the levers.

The indicating mechanism illustrated is able to exhibit at both the front and rear of the machine the nature and amount of each transaction entered, and this indication is so devised that the figures of the amounts will be displayed in their true denominational sequence when viewed from either front or rear. If desired the indicators may also be used to display totals during totaling operations.

With this brief general outline the features of the machine and particularly the indicating mechanism will now be described in detail with reference to the drawings which accompany and form part of the specification.

In the drawings:

Figure 4 is a vertical sectional view thru an amount key bank showing the complemental slides. This section is taken along the line 4—4 of Figure 2, looking in the direction of the arrows.

Figure 5 is a vertical sectional view taken toward the rear of an amount key bank along the line 5—5 of Figure 2 and shows the zero stop and complemental slides.

Figure 6 is a plan view of the total controlling levers, with their designating plates, and also showing the reset lever and lock.

Figure 7 is a plan view of the groups of special keys, namely, the transaction, clerk, and department keys.

Figure 14 is a detail side view of the cam used to operate the differential mechanism and other parts of the machine.

Figure 15 is a front view of the cam shown in Fig. 14.

Figure 16 is a front view, partly in section, of a portion of the differential mechanism.

Figure 17 is a side view of the differential mechanism shown in Figure 16.

Figure 18 is a detail view of one of the indicating tablets.

Figure 19 is a side view of the indicating tablet.

Figure 20 is a vertical section thru the indicating mechanism.

Figure 21 is a horizontal sectional view thru the indicating mechanism.

Figure 22 is a plan view of the indicator selection mechanism.

Figure 1:
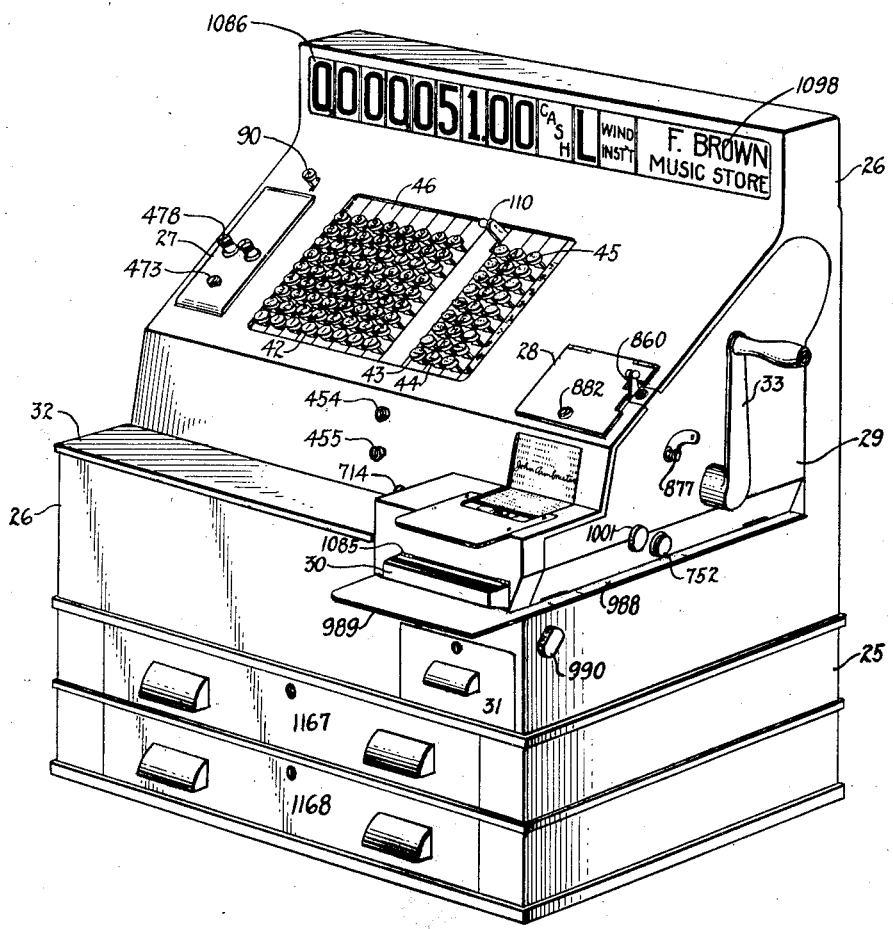
Figure 1 is a perspective view of the entire machine.

A casing 26 (Figs. 1, 2 and 3) is adapted to surround all of the usual frame work as well as the great majority of operative parts including those which extend beyond the main side frames. Suitable openings are provided in this casing for permitting the indicators to be viewed and permitting the necessary access to various portions of the machine. The casing, Fig. 1, has a hinged cover 27 for normally concealing the parts related to the total levers, covers 28 and 29 for permitting access to the printing mechanism. A drawer 31 may be provided below the printer unit and may be used for filing away installment sheets, charge account sheets, or similar slips. Openings are also provided in the casing for the key units and operating handle, as well as for other operative elements which must be accessible from the outside of the machine. A marble slab 32 may be provided on a front shelf of the case for retaining money, sales slips and the like, during the course of operation of the machine.

*Operating mechanism*

The machine illustrated is adapted to be driven by means of a hand crank 33, Fig. 1, although it will be understood that a motor may readily be provided to supply the motive power if desired. In actual use it will no doubt be advisable to employ a motor, since the machine will necessarily require a fair amount of power for its operation. The crank 33 is suitably connected for driving the main shaft 37 which extends across the entire machine and serves to transmit the power to certain operating parts at intermediate points within the machine as well as to certain mechanism at the left hand side of the machine on the outer side of the left side frame. It is on this side of the machine that a gear thereon serves to drive an idler gear 39 Fig. 3 which then transmits the power to gear 40 which is coupled by means of a hub to a camming unit 506 to be described in greater detail hereinafter.

*Keyboard*

As has already been mentioned, the machine disclosed is provided, as best shown in Fig. 1, with a number of banks of amount keys 42 which are sufficient to set up an amount up to $999,999.99. There are also provided three banks of special keys such as transaction keys 43, clerks' keys 44, and department keys 45.

Figure 2:
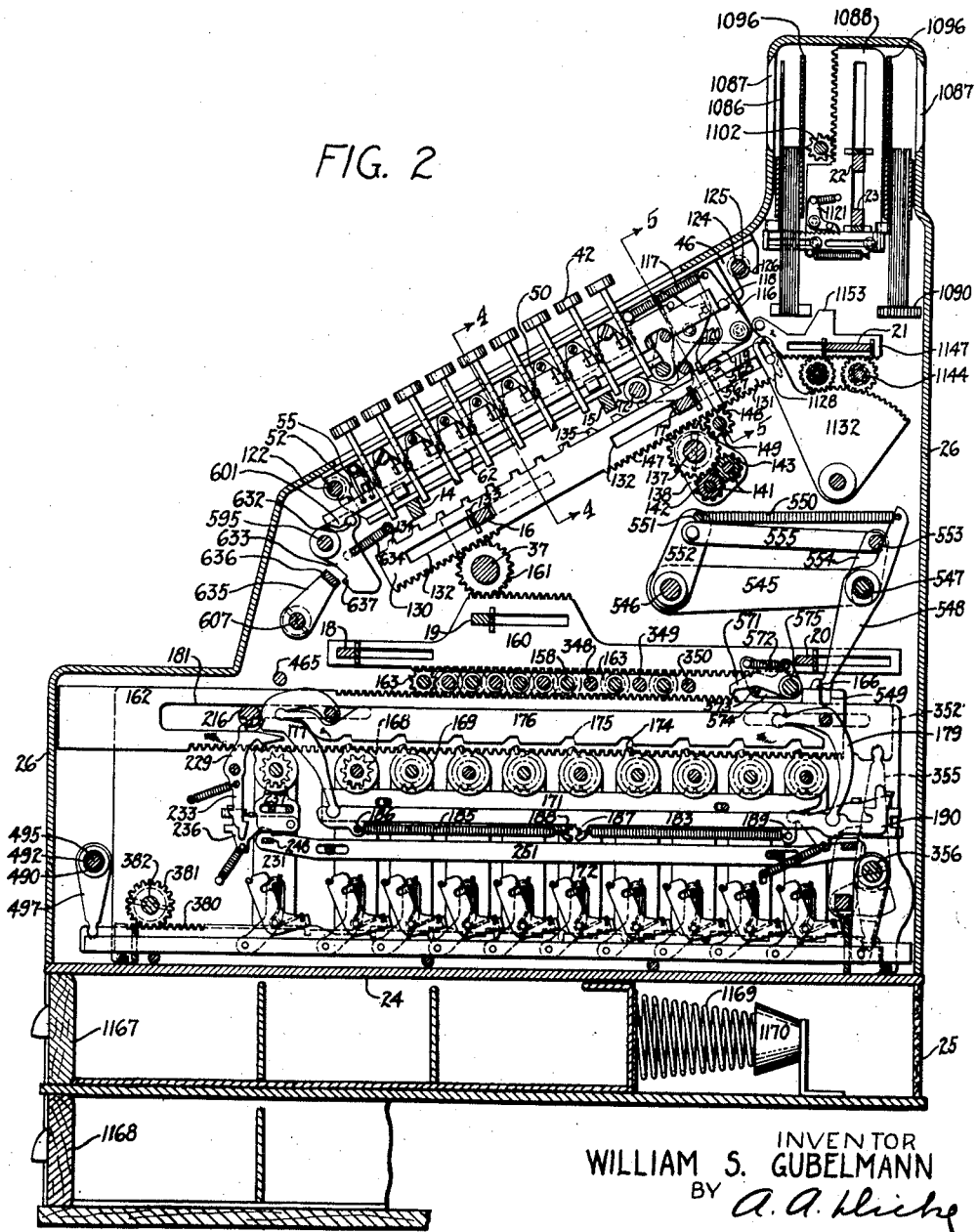
Figure 2 is a vertical sectional view thru the machine showing the differential mechanism, the indicators, a bank of universal totalizers, and the cash drawers.

Since all of the amount key banks are of the same construction and serve to control related differential devices in the same way, it will be necessary to describe only one bank in detail. As best shown in Fig. 2, each bank of keys is constructed and arranged as a separate unit removable as an entity together with certain associated latching and locking devices. For this purpose the main supporting structure for each bank comprises a channel member 46 (Figs. 1, 2, and 4) which is suitably slotted in its upper and lower overturned portions to receive the stems of the nine keys in the bank. Springs 47 (Fig. 4) connected between hooks 48 on the keys and studs 49 extending from the inner side of the web of the channel serve to hold the keys normally elevated. Usual or suitable means are provided to lock depressed keys down, to release them at will or when they have performed their function, to prevent the depression of more than one amount key in a bank, a zero stop 119, 120 is provided releasable by any amount key, and other usual and necessary means are provided.

Differential mechanism

The differential mechanism which is controlled by the amount keys is of the type employing members which are complementally movable in opposite directions and which thereby are permitted to be positively driven in both directions.

Again considering only a single representative order of the differential mechanism there is provided a pair of slide members 130 and 131 (Figs. 16 and 17) the first of which is movable upwardly and the second downwardly from the normal positions shown. These slide members are provided with suitable elongated slots 132 adapted to cooperate with the supporting bars 16 and 17 which are secured at their opposite ends to the side frames 9 and 10.

Comb plates 133 secured to the supporting bars serve to maintain the members in true vertical planes and also to hold them in the desired spaced relation. Each slide member is adapted to receive a variable movement up to nine steps and the two are so inter-related that if one receives the full nine steps of movement the other will be held stationary and at all times the sum of the movements of the two members, disregarding the direction of movement, will be nine steps. For the purpose of controlling the extent of movement of the members by the depression of a key the member 130 is provided with a series of nine projections 134 each having a square shoulder facing upwardly in the direction of movement of the member while the opposite face of each projection may be inclined to provide greater strength. Similarly the member 131 is provided with nine projections 135 having square shoulders facing downwardly and toward the front. Alternate ones of the projections 134 (Fig. 4) are offset or bent into a different plan from that of the member 130 itself and the remaining projections. So also alternate ones of the projections 135 are offset or bent out of the plane of the member 131 and in both instances the offset projections are bent away from the opposite member from the one on which they are formed. In this way the projections 134 and 135 are arranged in four separate rows. The lower end of the stem of each of the keys 42 is provided with a pair of projections 136 one of which projections is adapted to cooperate with a projection 134 on the member 130 and the other of which is adapted to cooperate with a projection 135 on member 131. In order to take care of the four positions, which the projections on the members may assume, the ends of the keys may be regarded as divided into four sections. The pair of projections on one key may be in the first and third sections while the pair of projections on the next key in the bank will be in the second and fourth sections and so on for alternate keys. This permits alternate keys to co-operate with say a straight projection on one member and a bent projection on the other while the remaining keys have just the opposite relation. In this way the members are allowed to travel a maximum extent equal to almost double the key spacing.

Normally the member 130 is prevented from movement by the downwardly extending arm of the previously mentioned member 116 (Fig. 2) whose lug 120 cooperates with the uppermost projection 134. When some key in the bank is depressed, however, this pivoted member is rocked, as explained, and its lug is withdrawn from the projection at the upper end of member 130. Upon subsequent operation of the machine, as will be explained, the member 130 is shifted up and to the rear until stopped by engagement of one of its projections with the depressed key or by engagement of the lower ends of the slots 132 with the supports 16 and 17. The extent of movement of the member will be directly proportional to the value of the key depressed. Member 131 on the other hand is normally free to move downwardly upon operations of the machine and if no key in the bank has been depressed this member will move an extent equal to nine steps. At all times it will move an extent which is the nine's complement of the distance through which the member 130 is moved upwardly. This means that when the upper or nine key is depressed member 131 will be locked against any downward movement.

The means for driving the members 130 and 131 in the way explained comprises a differential gear construction (Figs. 2, 16 and 17) operated by a rock shaft 137. For this purpose there is secured to this shaft a pair of frames 138, one located to the right and the other beyond the left of the group of members 130 and 131. The frames consist preferably of a pair of plates the hubs 139 of which will be secured to the shaft as by pins 140. A pair of shafts 141 supported at opposite ends in these frame plates is provided and one of these carries a series of broad toothed pinions 142 loosely mounted thereon while the other carries a similar series of pinions 143 in such a way that a pinion of each series is inter-geared with a pinion of the other series through the engagement of only a portion of the width of the teeth. Loosely mounted on the operating shaft 137 by means of hubs 144 are a plurality of pairs of adjacent gears 145 and 146, each of the gears 145 being adapted to mesh with one of the pinions 142 and each of the gears 146 being adapted to mesh with one of the pinions 143. Each gear 145 is adapted to mesh directly with teeth 147 formed on the underside of a corresponding member 130 while each gear 146 meshes with an idler 148 on a shaft 149 fixed in the side frames, each idler in turn meshing with teeth 150 formed on the underside of a corresponding member 131.

Upon operations of the machine the shaft 137 is rocked first clockwise (Figs. 2 and 17) and then counter-clockwise. It will be apparent that clockwise movement of this shaft will tend to cause the pinions 142 and 143 to carry the two sets of gears 145 and 146 clockwise about the shaft so that each gear 145 will tend to move its member 130 upwardly while each gear 146 through idler 148 will tend to move its member 131 downwardly. Now when one of the members is stopped as by engagement of one of the projections thereon with a depressed key its corresponding gear 145 or 146 will be arrested and the inter-meshed pinion, either 142 or 143, will be made to planetate about this gear and will cause a double movement of the remaining gear and member until the full clockwise movement of the shaft 137 is completed. Thus assuming that the 1 key were depressed in a particular bank both of the members 130 and 131 will be shifted a single step during the initial movement of shaft 137 while continued movement of the latter will cause pinion 142 to planetate about the gear 145 which has by this time become fixed. The remaining pinion 143 will then be rotated counter-clockwise on its shaft 141 in addition to partaking of the bodily movement of the latter so the gear 146, idler 148 and member 131 will be shifted at double speed to take up the remaining clockwise movement of shaft 137. On the return movement of shaft 137 it will be obvious that the parts will be restored to the normal position shown in Fig. 2.

Figure 3:
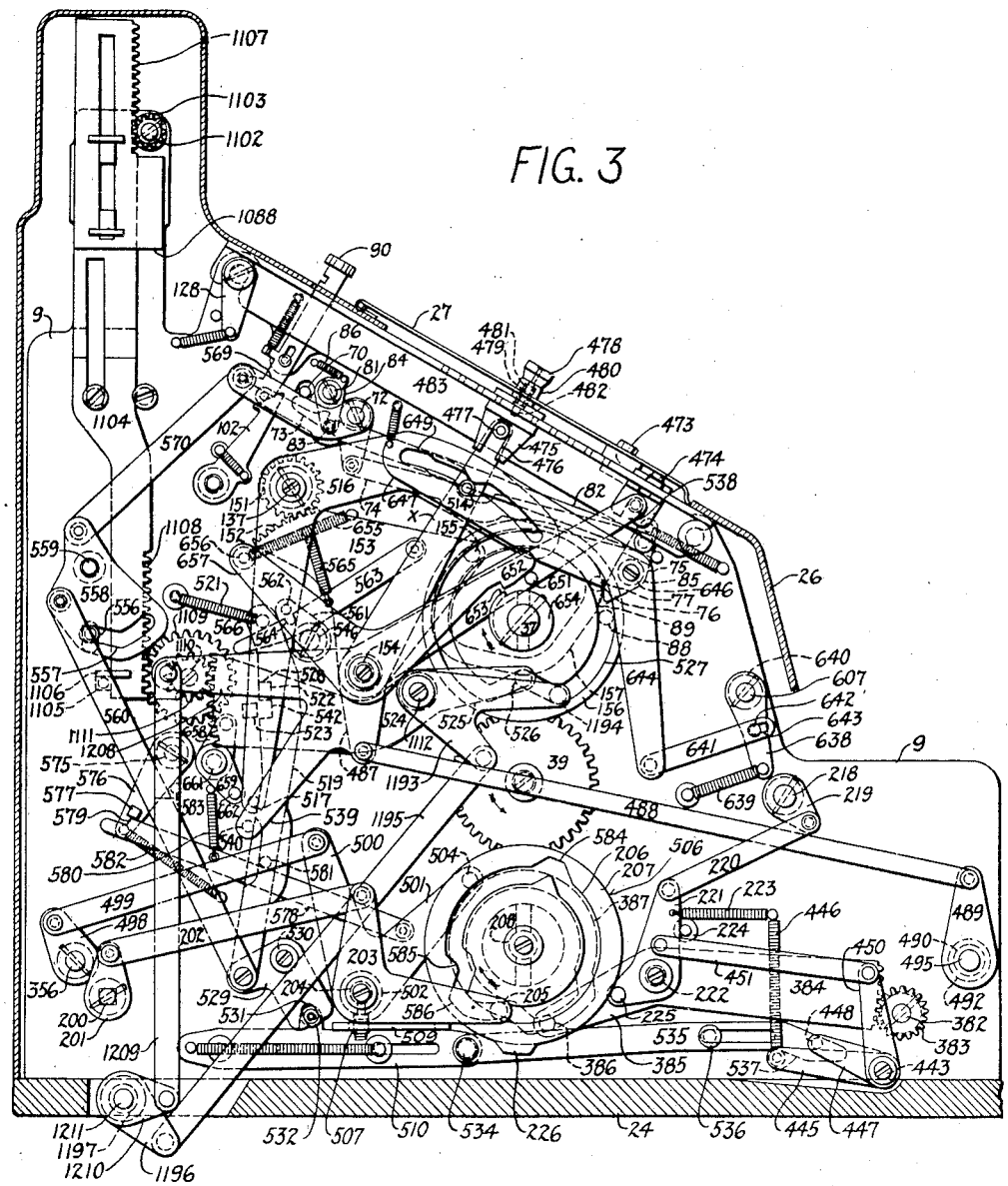
Figure 3 is a side elevation of the machine showing the control mechanism mounted on the left side frame of the machine.

The means for rocking the shaft 137 as explained, as best shown in Fig. 3, comprises a pinion 151 secured to this shaft toward its left end and adapted to be engaged by segment teeth 152 carried by a plate 153 pivoted on a stud 154. This plate is provided with a roller 155 which cooperates with a cam 156 (Fig. 14) that forms a part of a unit that is secured to the drive shaft 37. The groove 157 in the cam 156 is so formed as to rock the plate 153 and shaft as required it being noted that a considerable dwell portion is provided before, intermediate and after the two movements of the plate in order to allow time for the performance of other necessary functions.

Control of actuators

As has already been briefly explained, the present machine is provided with a large number of totalizers and these are arranged in banks each extending from front to rear of the machine and the several banks being horizontally arranged across a considerable portion of the width of the machine. This means that a set of actuators must be provided for each bank of totalizers and each set must contain an actuator corresponding to each denominational order of the keyboard. Due to the necessity of using these actuators in connection with the printing and indicating of totals, as will be explained more fully hereinafter, one set must be provided for each bank of item counters as well. In the illustrative machine this calls for eight actuators corresponding to each denomination of the keyboard, each actuator being capable of operating a particular order of any of the totalizers or counters in a particular bank. As a convenient means of coordinating the eight actuators which must partake of the same movement under the control of one of the banks of keys a shaft 158 (Fig. 2) is provided for each denominational order. There are, therefore, as many of these shafts extending across the machine between the pair of side frames as there are banks of amount keys on the keyboard and as shown there is one additional similar shaft 165, making nine in all, for the purpose of taking totals from an extra or overflow order provided in each totalizer as will be explained.

The connections for driving the shafts 158 to differential extents comprise pinions 159 secured one to each shaft and each meshing with a rack 160 (Fig. 2) supported by suitable cross bars 18, 19, and 20, each in turn meshing with a gear 161 loosely mounted on the shaft 37. These gears 161 are of extra width and are adapted to transmit the movement of the members 130 to the racks 160. For the purpose of driving the actuators 162 of which, as stated, there are eight for each denominational order, each shaft 158 is provided with seven pinions 163 secured thereto. The eighth actuator is driven directly by the pinion 159 which, as before mentioned, serves to transmit the movement of the rack 160 to the shaft.

For printing and indicating totals from the extra or overflow order of the totalizers and counters, eight actuators are also provided. One of these actuators has an extra shoulder 166 (Fig. 2) which is adapted to cooperate with an element that is stationary on item operations and thus confines the entire inter-connected group of actuators in normal position when not taking totals, as will later be explained. The actuators for this denominational order mesh with related pinions 159 and 163 secured to the shaft 165, the pinion 159 meshing with the corresponding rack 160. This rack cooperates with a gear loose on the shaft 37 similar to gears 161; this gear then drives a special member 130 not associated with any key bank. This member 130 then meshes with a gear 1451 (Fig. 16) similar to those related to the banks of keys and loose on shaft 137. The gear 1451 then meshes with a gear 1481 similar to the idler gears 148 related to the key banks and mounted on fixed shaft 149. That portion of gear 1481 which is out of the plane of gear 1451 then drives a slide 1129 similar to the slides 131, the resultant movement being in the proper downward and forward direction as required for the indicator positioning mechanism to be hereinafter described.

As will be more fully explained in connection with the construction of the totalizers each order of each of the latter is restricted to two thicknesses of relatively thin metal, say fifty thousandths of an inch thick. The actuators which are of the same thickness are spaced an amount substantially equal to their thickness. That is to say the group of actuators 162 that are related to one bank of totalizers will be separated from each other by only about fifty thousandths of an inch. The groups of actuators related to different banks of totalizers are spaced a greater distance.

Totalizers

As has been stated hereinbefore the illustrative machine is equipped with forty-two totalizers of various constructions. A detailed description thereof is not deemed necessary for the purposes of this application. Their construction and that of the means for their selection may be of any known or suitable type, it being understood that in total taking the totalizers serve to control at least a part of the differential mechanism in accordance with a function of the amount on the totalizer, which mechanism serves to set the printing mechanism and indicator mechanism to print and indicate said total.

Special key banks

In addition to the banks of amount keys the machine, as already suggested, is provided with several banks of special keys, there being three such banks shown (Fig. 7). These are devoted to the designation of clerks, transactions and departments and are indicated respectively by the characters 44, 43, and 45.

Figure 8:
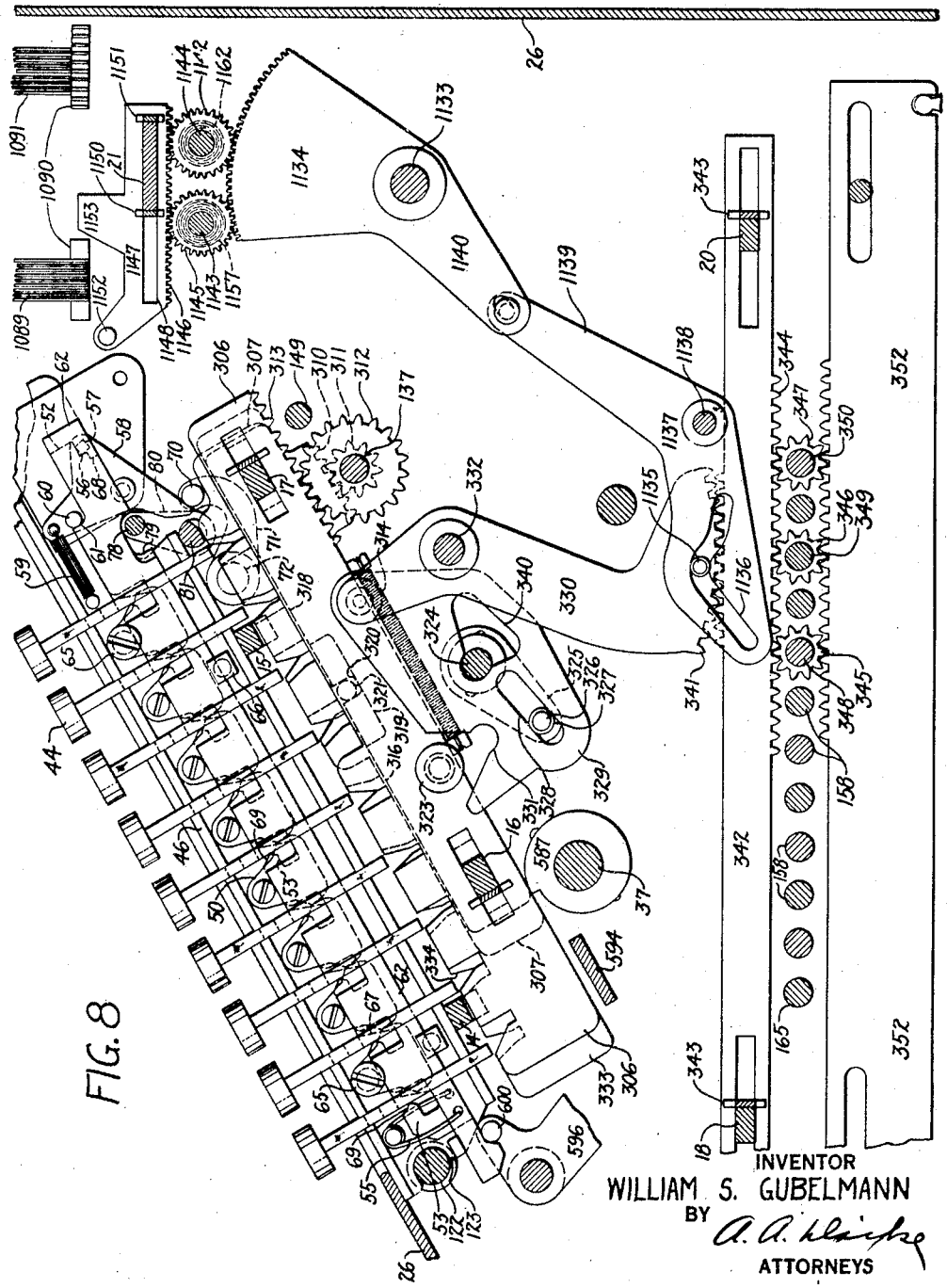
Figure 8 is a vertical sectional view of a special key bank showing also the selection mechanism operated under control of the special keys.

The construction and arrangement of these keys in each bank are substantially the same as for the amount keys. Thus, there is provided for each bank a detent bar 52 (Fig. 8) carrying hooks or beaks 53 to engage openings in the several keys to hold them depressed or elevated and there is also a release bar 62 which upon depression of a key serves to release the detent bar 52 for one step of movement to latch the key. Single key pendants 50 adapted to permit the full depression of only a single key in a bank are also provided. The parts, furthermore, are mounted in a channel frame 46 which serves to establish a unit assembly of these parts. Upon operation of the main operating mechanism the plate 58 will be rocked an additional step by means of the rod 70 carried by arms 71 secured to the shaft 72 to permit the detent bar 52 to move still further toward the rear so that the beaks 53 may completely lock the keys in whatever position they may happen to be. Toward the end of an operation of the machine the cross rod 78 engages a shoulder 79 on the detent bar and restores it to normal thereby releasing the keys.

The differential mechanism controlled by the special banks of keys is required to take effect much sooner than the amount differentials due to the control of the special keys over the totalizer selecting mechanism as will be explained in a later section. On account of the form of differential mechanism adopted the special keys are not provided with the projections and cut out portions to be found at the ends of the amount keys but are preferably flat across the bottom ends. Another feature of distinction between these banks and the amount banks is that no zero stops are provided for the special keys. This is due to the fact that certain springs are provided to maintain the parts in normal and the depression of some key in each of these banks is always required to release the machine, except in totaling operations, as will be explained.

Figure 12:
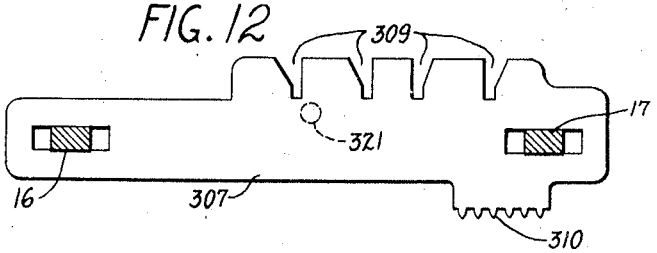
Figure 12 is a detail view of a positioning slide acted upon by the four rear special keys of a bank.
Figure 13:
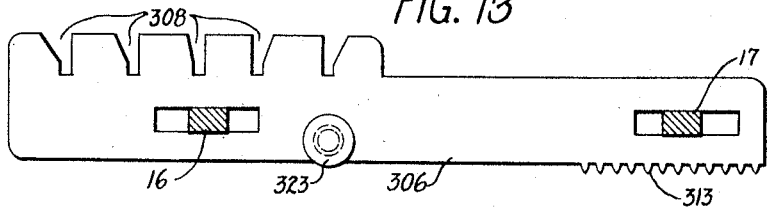
Figure 13 is a detail view of a positioning slide acted upon by the five front special keys of a bank.

Each of the special key banks (Fig. 8) is provided with a pair of slides 306 (Fig. 13) and 307 (Fig. 12) having a series of slots 308 and 309, respectively. The five lowermost keys (Fig. 8) are adapted to cooperate directly with the slots 308 in the slide 306 and these slots have one edge of graded inclination and one edge straight. The construction is such that the lowermost key will shift the slide three steps downwardly while the next key will shift it two steps downwardly and the third key from the bottom will shift the slide only one step downwardly. On the other hand the fourth and fifth keys will move the slide upwardly one and two steps respectively.

Figure 9:
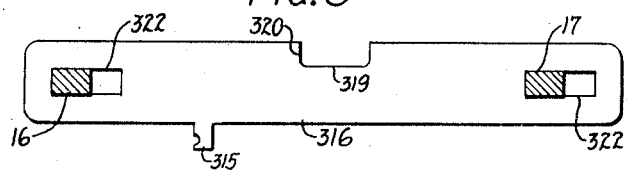
Figure 9 is a detail view of the rearwardly tensioned centralizing slide for a special key bank.
Figure 10:
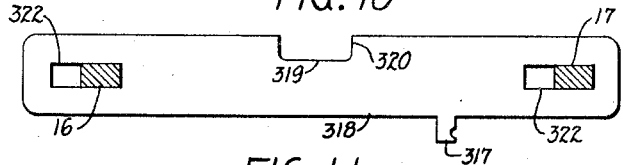
Figure 10 is a detail view of the forwardly tensioned centralizing slide for a special key bank.

The four uppermost keys in the bank cooperate with the slots 309 in the slide 307, and these slots are so arranged that the slide is moved upwardly two steps by the uppermost key, and one and one-half steps by the next key, while the third key from the top shifts the slide downwardly two steps and the fourth key moves it two and one-half steps in this direction. A rack portion 310 on the slide 307 meshes with a pinion 311 mounted loosely on a reduced portion of the shaft 137. Secured to this pinion is a larger gear 312 of twice the diameter of the pinion and this gear meshes with rack teeth 313 formed on the slide 306. It will be understood therefore that any movement of the slide 307 will be transmitted to the slide 306 and in such a way as to cause twice as great a movement of the latter slide. Considering the movements of the slides, as already mentioned, it will be apparent that the slide 306 may be shifted to any one of five different extents downwardly or any one of four different extents upwardly depending upon the key depressed, the greater movements in either direction being brought about indirectly through the slide 307 and the gear and pinion connection. A spring 314 extending between a lug 315 depending from a slide 316 (Fig. 9) and a lug 317 depending from a slide 318 (Fig. 10) serves to maintain these parts normally in the position shown in Fig. 8. For this purpose the two centralizing slides are provided with cut-out portions 319 forming shoulders 320 which engage opposite sides of a pin 321 on the slide 307. The supporting slots 322 cooperating with the bars 16 serve to limit the movement of the slides under influence of the spring 314. Due to the two to one relation between the movements of the two slides any movement of the slides from normal will tend to stretch the spring 314 and this will be opposed by the spring itself.

A stud 323 is mounted on the slide 306 and is carried thereby to any one of nine different positions, five down and four up from the normal. This positioning of the stud takes place at once upon the depression of one of the special keys and prior to any movement of the main operating mechanism. Now as the operating mechanism begins to operate the shaft 324 will be rocked by connections which will presently be described. Arms 325 secured to this shaft carry a rod 326 and rollers 327 which cooperate with a slot 328 in a plate 329 pivoted to the upper end of a bell-crank member 330. A V notch 331 in the plate is adapted to cooperate with the stud 323 as the plate is rocked and since the stud is held firmly in one of its nine positions of adjustment the V camming notch will force the plate together with its own pivot either to the right or left an amount corresponding to the key depressed. This means that the bell-crank member 330 will be rocked about the fixed pivot 332 to an extent depending upon the key which has been depressed.

Figure 11:
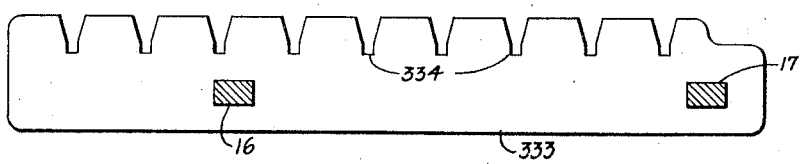
Figure 11 is a detail view of a fixed plate used to guide and strengthen the ends of the special keys.

A special plate 333 (Fig. 11) having a series of slots 334 which are in direct alinement with the several keys of a bank serves to guide the lower ends of the keys as they are depressed and holds them steady. These slots are wide at their upper ends but taper down to the width of the keys at their lower ends. The slots in the slides 306 and 307 likewise converge toward the bottom into a narrower straight sided alining portion and a similar construction is provided for the V notch 331. Any suitable means are provided for operating the rock shaft 324 to rock the plates 329 at the beginning of an operation of the machine.

Teeth 341 formed on an extension at the lower end of the bell-crank member 330 (Fig. 8) mesh with a rack slide 342 which is mounted on the cross-bars 18 and 19 that support the amount racks 160. Comb plates 343 serve to maintain the proper position and alinement of these racks. Rack teeth 344 on the undersides of the rack slides 342 are adapted to mesh with a pinion 345, 346 or 347, secured respectively to shafts 348, 349 and 350, similar to the amount denominational shafts 158. It will be understood, therefore, that a shaft is provided for each bank of special keys so that, thereby totalizers in as many of the banks of totalizers as may be selected for item entry and total printing and indicating.

Item counters

Mention has already been made of the fact that the present machine has, for purposes of illustration, been provided with a number of item counters which are adapted to segregate the entries and keep an accurate count of the number of entries of certain specified types, i. e., those representing actual sales, related to each of the special keys in the three banks. For this purpose twenty-seven counters are required and these are arranged in three banks of nine each. Three additional counters are also provided for the purpose of keeping count of the grand total number of sales made by the entire group of clerks and the total number of operations of the machine effected under control of cashiers 1 and 2 respectively.

It is only necessary to operate of the nine counters of a group during an operation of the machine and this may be done by any suitable means.

Totaling controls

In the foregoing sections the operation of the totalizers and counters has been considered only from the standpoint of item entering which, as explained, may involve either adding or subtracting upon certain selected ones. Provision is also made for the taking of totals from any one of the totalizers or counters in such a way that the amount standing thereon may be determined by means of both indicating and recording mechanisms and furthermore the operation may or may not involve resetting as desired.

For the purpose of determining the condition of the machine as between item entering and total taking a pair of levers X and Y (Figs. 3 and 6) are provided and these are normally locked in their item entering or adding positions by passing thru openings in the cover 27 which is provided with a lock 473 so that only authorized persons carrying the necessary key may determine totals. Movement of one of the levers X or Y will only condition the machine for what is commonly known as a sub-total or read total and will not bring about resetting of the selected totalizer or counter. Whenever it is desired to reset the totalizer or counter selected for totaling it is necessary also to turn the reset lock 474 (Fig. 6) prior to an operation of the main operating mechanism. In order to restrict resetting operations to special parties such as auditors or the like the lock 474 is preferably designed to receive a key different from that required to unlock the levers X and Y. Thus while a manager or perhaps a cashier may be permitted to take sub-totals the operation of resetting is under the control of only the proprietor or a trusted auditor.

The necessity for a large number of totaling positions and hence the desirability of employing a plurality of levers will be apparent when it is considered that there are a large number of totalizers as to which there is no direct means of selection. For example, the selection of any one of the adding and subtracting totalizers depends upon several controlling factors, each of which tends to control the selection of other totalizers as well so that the mere conditioning of the machine for totals is not enough when these totalizers are to be selected. Within the purview of the present invention any suitable means for this purpose may be utilized.

Indicating mechanism

The indicating mechanism forming the subject of the present invention comprises means for displaying in large visual characters the amount of a transaction together with the designation of the nature of the transaction and the clerk and department involved. For this purpose indicator tablets are provided and adapted to be exposed both at the front and at the rear of the machine.

The indicator tablets 1086 are all mounted near the top of the rear portion of the machine and are displayed, front and rear, thru glass windows 1087 provided in the casing (Fig. 2). There are eight banks of amount keys and each of said banks is represented by two sets of tablets, one set arranged to be read from the front of the machine and the other set being arranged to be read from the rear both being in correct denominational order. There are also two sets of tablets one front and one rear, to indicate the amounts standing on the overflow wheels of the totalizers. These overflow sets will only be required in indicating totals to take care of the extra order beyond the key capacity which is provided in each totalizer and counter as previously mentioned. The three special banks of keys are, as stated, similarly represented by tablets, each of said banks having two sets of tablets, for front and rear indication. These special tablets need not be arranged to present the same order of appearance to the operator when viewed from the front as when viewed by the customer from the rear, as is the case with the amount tablets since their relative order is immaterial. For this reason like sets of special character tablets may be directly alined for front and rear indication. The amount sets of indicators however, for the units or pennies tablets are alined from front to rear with the overflow or millions of dollars tablets (Fig. 21) both being lifted by a common lifting plate 1088. Similarly the dimes set of tablets for the front will be alined with the hundreds of thousands of dollars tablets for the rear and so on. It will be clear that the hundreds of dollars tablets, due to their central position among the amount indicators, will be alined at the front and rear of the machine.

Each tablet 1086 (Fig. 18) consists of a very thin sheet of metal, say for example twenty thousandths of an inch in thickness, having a downwardly extending finger 1089 with an offset portion of finger 1090 used in lifting the tablet as will be explained. It is also provided with another plain finger 1091 used as a guide. The offset portions 1090 extend varying distances, front and rear, from the plane of the tablets, the arrangement being such that each of the ten tablets comprising a set has a different plane for the offset finger (Fig. 21), and the ends of the ten offsets are spaced at equal intervals. The transaction tablets 1092 (Fig. 21) and the department tablets 1093 are slightly wider than the amount tablets 1086 and clerks' tablets 1094 since a proper designation of each of these requires several letters.

A compartment or rectangular box (Fig. 21) is provided for each set of tablets. The series of boxes for the front and the rear indicators are formed in the same way by means of plates 1095 and 1096 which are secured to the side frames 9 and 10, and are spaced sufficiently to provide for the thickness of an entire group of ten tablets. Partitions 1097 serve to divide the two large boxes for the front and the rear indicators into smaller compartments which confine and guide the indicators of a single group. The inner plates may be useful furthermore for advertisement display purposes, the portion behind the raised tablets being visible during a portion of the operation of the machine. The portion 1098 (Fig. 1) of the indicator space to the right of the groups of tablets may be provided with advertising matter either on the plate 1096 or directly on the glass 1087.

Between the two main boxes which guide and confine the indicators are a series of lifting plates 1088 (Figs. 20 and 21) slidably mounted on bars 22 and 23 (Fig. 20) extending between the side frames, and guided and held in position by means of comb plates 1099 secured to the bars. These lifting plates 1088, each of which is common to a front and a rear group of tablets, have rack portions 1100 in engagement with the teeth of pinions 1101 which are secured to a shaft 1102. On a portion of shaft 1102 (Fig. 3) extending beyond the left side frame 9 is secured another pinion 1103. In mesh with the latter is an operating rack slide 1104 guided by extensions of the bars 22 and 23 as well as by a guide stud 1105 and comb 1106 at the lower end. The operating rack 1104 has two rack portions, one portion 1107 being in mesh with the pinion 1103 and the other rack portion 1108 being in mesh with a gear 1109. This gear 1109 which is loosely mounted on a stud 1110 extending from the side frame 9 has secured to it a smaller gear 1111. The purpose of this double gear construction is to produce a greater movement of the rack slide 1104 than is imparted to the small gear 1111 by means of the segment 524. It will be recalled that this segment which is pivoted at 1112 has a roller 526 cooperating with a groove 527 (Fig. 14) in the disk 156. The groove 527 is so designed that at the start of the operation of the machine, operating rack slide 1104 is lowered, at the middle of the operation it is raised slightly and toward the end of the operation it is raised fully to its normal position. Through the shaft 1102 and the pinions 1101 the movement of slide 1104 is imparted to the lifting plates 1088.

Each lifting plate 1088, for the amount tablets 1086, has mounted thereon two independently movable selecting sides 1113 and 1114 (Figs. 20 and 21). Two double headed studs 1115 carried by the lifting plate 1088 cooperate with guide slots 1116 in each of the selecting slides 1113 and 1114. Both slides are urged to the left (Fig. 20) by a pair of springs 1117 connected betewen a finger 1118 on each of the slides and studs 1119 on the lifting plate 1088. On each side of the lifting plate 1088 there is pivoted on a stud 1120 a positioning pawl or detent 1121. These pawls normally have their pointed ends 1122 engaged in one of a series of notches 1123 in the corresponding slides 1113 and 1114, being urged in this direction by means of tension spring 1124. Thus the slides are held in any set position, by pawls 1121, against the pull of springs 1117. The selecting slide 1114 which is on the right side of the plate 1088 (Fig. 21) has an overturned lug 1125 adapted to cooperate with the offset portions 1090 of the front tablets 1086 to raise the latter, and this lug also serves as a means for positioning the slide as will later be explained. The left hand selecting slide 1113 has two overturned lugs 1126 and 1127; the lug 1126 serves as a positioning surface, as will be explained, while the other lug 1127 cooperates with the offset portions 1090 of the rear tablets to lift the latter.

For the six sets of tablets related to the three banks of special keys, only the left hand selecting slide 1113 need be provided on each lifting plate 1088 since this slide may be adapted to lift both a front and a rear tablet which will always correspond. In the case of these three slides the lugs 1126 cooperate with the front tablets (Fig. 21) as well as with the positioning means while lugs 1127 cooperate with the rear tablets to lift the latter.

From the above description it is obvious that every selecting slide 1113 or 1114 can independently lift and lower any one of its related set of tablets. It will be apparent also that after permitting the lowering of the previously raised tablets the selecting slides must be released to permit them to assume their normal positions so that they may then be shifted to new positions to lift other tablets representing the new item or they may, if desired, be shifted directly to their new positions. The mechanism for positioning the selecting slides will now be described.

A pin 1128 (Figs. 2 and 20) in the upper end of each of the complemental slides 131, as well as the overflow order slide 1129 (Fig. 22), extends into a slot 1130 (Fig. 20) in the upwardly extending arm 1131 of a segment 1132. These segments 1132 are loosely mounted on a shaft 1133 supported by the side frames 9 and 10. Three additional segments 1134 positioned by the special key mechanism (Fig. 8) are also mounted on shaft 1133. For positioning these special segments a roller 1135 (Fig. 8) on each of the segments 330 extends thru a cam slot 1136 in one of a series of bell cranks 1137. The three bell cranks 1137 are loosely mounted on a shaft 1138 which is mounted within the frame of the machine. Each bell crank 1137 has an arm 1139 overlapping an arm 1140 on a corresponding one of the segments 1134 and has a pin and slot connection with this arm. The cam slot 1136 is so shaped that the arm 1139 may be rocked clockwise to any one of nine positions upon depression of a selected one of the special keys and the subsequent operation of the machine which rocks the special key differential segment 330. It will be understood that the segments 1132 are rocked counter-clockwise under control of the complemental slides 131 either in accordance with the keys depressed in item entering operations, or in accordance with the values standing on the totalizer or counter wheels selected during totaling operations. The segments 1134 are only rocked in accordance with the special keys depressed.

The teeth 1141 (Fig. 20) on the segments 1132 and 1134 mesh with pinions 1142 secured to one or another of two series of nested tubes mounted on shafts 1143 and 1144. Two shafts and sets of tubes are provided in order to simplify the tubing construction. Other pinions 1145, on the tubes at the proper points, mesh with rack teeth 1146 or positioning slides 1147 mounted by means of slots 1148 on the cross bar 21 and held in position by combs 1150 and 1151. Each positioning slide 1147 has a stud 1152 which cooperates with one of the lugs 1126 or 1125 on a related selecting slide 1113 or 1114, when the latter together with its carrier plate 1088 is lowered, to position the slide in accordance with the movements of its segment 1132 or 1134. The upper surface of a stop shoulder 1153 (Fig. 20) on the positioning slide 1147 is adapted to engage a pin 1154 on the related pawl 1121 when the lifting plate 1088 is in its lowermost position. The point 1122 of the pawl is at this time held out of engagement with the ratchet teeth 1123 so that the corresponding slide 1113 or 1114 will be released, letting spring 1117 pull it to the left (Fig. 20) until it is stopped by the stud 1152 on the positioning slide 1147.

As shown in Fig. 22 the tubes for the amount tablets have secured to each a pinion 1142 in mesh with the related segment 1132, and two pinions 1145 in mesh with two different positioning slides 1147. One of these slides positions a selecting slide 1113 for controlling the rear indication and the other positions a slide 1114 for controlling the front indication. Thus the units of cents tube 1155 is mounted directly on the shaft 1143 and has its pinions 1145 near the extreme ends of the tubes the left hand pinion being provided to control the rear indication and the right hand pinion being provided to control the front indication. Just to the left of the right hand pinion 1145 will be found the pinion 1142 for positioning the tube. The units of dollars tube 1156, the hundreds of dollars tube 1157, the tens of thousand dollars tube 1158 and the millions of dollars or overflow bank tube 1159 are also mounted on the shaft 1143 in nested formation while the tens of cents tube 1160, the tens of dollars tube 1161, the thousands of dollars tube 1162 and the hundreds of thousand dollars tube 1163 are mounted in nested formation on the shaft 1144. It will be apparent that the order of arrangement of the tubes on the pair of shafts 1143 and 1144 depends on the necessary location of the pinions 1142 and 1145 as determined respectively by the location of the controlling key banks, and the positions of the corresponding indicators with their related slides 1113 and 1114. It has been found that with the arrangement of the tubes and the spacing of other parts as shown in Fig. 20 the pinions may be located as required without offsetting more than one of the connecting pieces 1132 between the key set differential slides 131 and their corresponding pinions 1142, and that connection need only be slightly offset. The offset connection is to the pinion on tube 1163 (Fig. 22).

The tubes for the special tablets (Fig. 22) have only one pinion 1142 on each in mesh with the related segments 1134 and one pinion 1145 on each in mesh with a positioning slide 1147. This single positioning slide 1147 for each positions a selecting slide 1113 which, as previously explained, lifts tablets for both front and rear indication of the special characters. The transaction tube 1164 and the department tube 1165 are mounted on the shaft 1143 while the clerk's tube 1166 is mounted on the shaft 1144. A general discussion of the operating sequence of the indicator parts described above will now be given.

At the very beginning of the operation of the machine the lifting plates 1088 (Fig. 20) are lowered, and carry with them the previously raised indicator tablets, the final portion of this movement resulting in the rocking of the pawls 1121 by engagement of pins 1154, with the extensions or shoulders 1153 to release the slides 1113 and 1114. These slides are then restored to the extreme left (Fig. 20) by the springs 1117 and are now ready to be again positioned to select a new tablet. For this purpose the special key differential mechanism (Fig. 8) acts first to effect the positioning of the selecting slides 1113 by means of the segments 1134, the tubes 1164, 1165 and 1166, (Fig. 22) and the positioning slides 1147 on which the pins 1152 are adapted to cooperate with the bent ends of the slide 1113. The amount selecting slides 1113 and 1114 are next positioned, by virtue of the movement of the complementary slides 131 upon the operation of the differential mechanism (Figs. 2 and 20) which is entirely positive in action in item entering operations and driven by spring levers 548 (Fig. 2) in totaling operations. The connections from the complementary slides for this purpose include the segments 1132, the related tubes on the shafts 1143 and 1144, and the positioning slides 1147 with their pins 1152 adapted to engage the bent ends of the selecting slides.

The selecting slides 1113 and 1114 being positioned in this manner are now ready to raise the new tablets. It will be observed that these slides would not remain in their new positions if the lifting plates 1088 were kept in their lowermost positions while the complementary slides 131 are being returned to their initial positions since the detents 1122 would still be held inactive. For this reason the plates 1088 are lifted slightly at about the midpoint in the operation of the machine after the complementary slides 131 have partaken of their full movement and are still stationary. This movement of the plates is sufficient to permit the springs 1124 (Fig. 20) to rock the pawls 1121 and lower the detent points 1122 into the adjacent notches 1123 of the selecting slides 1113 and 1114, thus holding the slides in their adjusted positions in spite of the subsequent return movement of the positioning slides 1147 during the last half of the operation of the machine. Toward the very end of the operation the plates 1088 are lifted further into their normal positions so that the lugs 1125, 1126 and 1127 on the selecting slides 1113 and 1114 cooperating with the offset portions 1090 of the selected tablets will lift the latter to their exposed positions.

It will be understood that the arrangement of the tablets in each group will be such that the offset portions 1090 will fall in appropriate sequence to be selected properly by the lugs 1125, 1126 and 1127. In connection with the amount indicators this necessitates consideration of the fact that for those controlled by the key banks the segments 1132 and slides 1147 will be adjusted in accordance with the complements of the keys depressed or of the amounts on the wheels whereas for the overflow groups of indicators the control over the segment 1132 and slides 1147 will be from an element which moves in direct correspondence with the amount on the overflow wheel. This obviously will call for a different order of the indicators in the overflow groups from that in the other amount groups.

Preferably the surfaces 1153 on the positioning slides 1147 are of sufficient length to cooperate with the pins 1154 of the detent pawls regardless of the extent to which the slides are shifted. However, it will be observed that if the surfaces are too short for this purpose the mechanism will still function properly. The pawls 1121 will be permitted to rock into active engagement with the ratchet teeth 1123 earlier than otherwise, i. e. whenever the slides 1147 are given the larger extents of movement as for example more than five steps, however the further movement of the selecting slides 1113 and 1114 will not be interfered with but will result merely in an idle ratcheting action between the pawls and the teeth 1123.

Thus it will be seen that during item entering operations the amount of the item, the nature of the transaction, the department and the clerk's initial will be indicated, and that in totaling operations the same information will be indicated.

Timing chart

Figure 23:
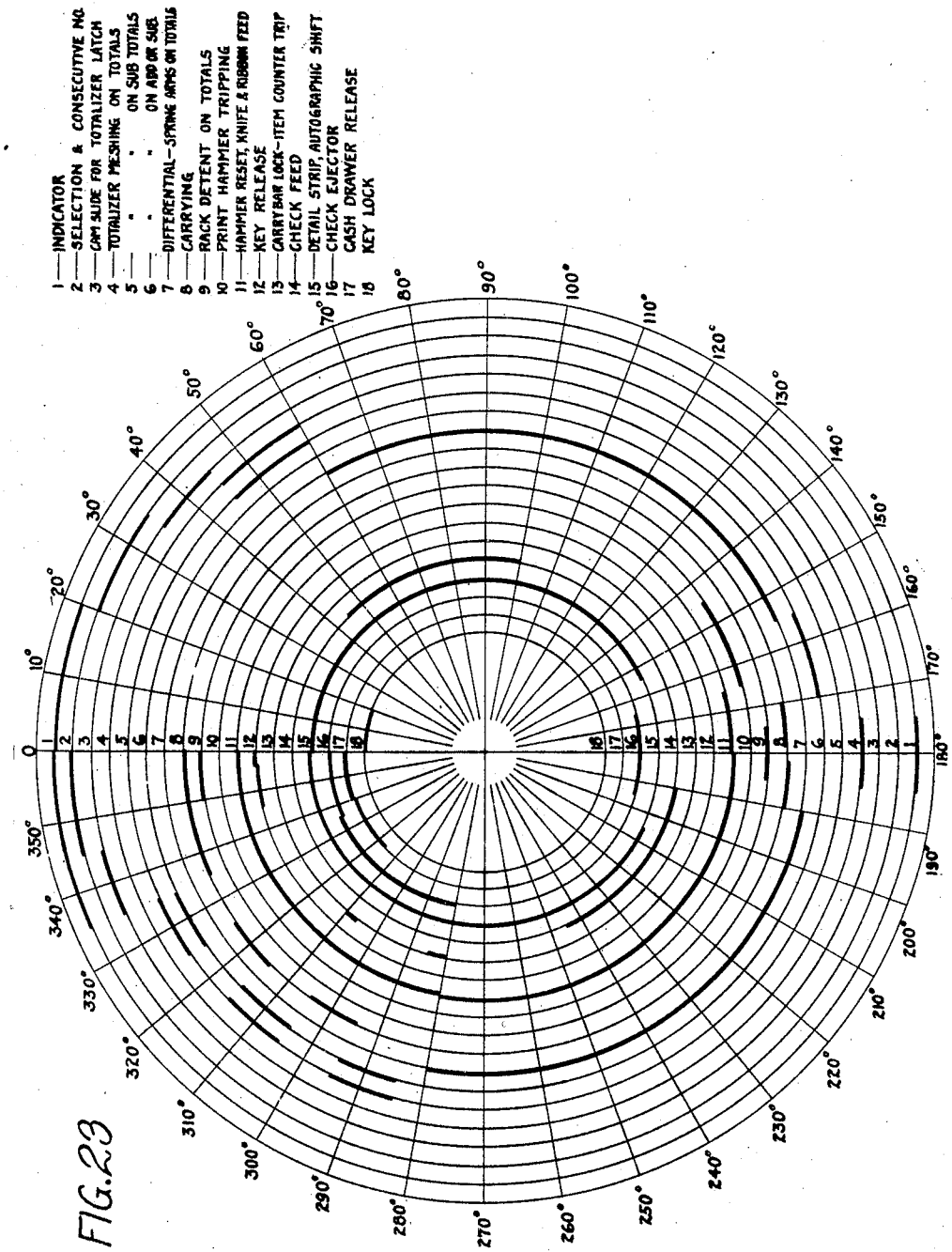
Figure 23 is a chart showing graphically the timing of the major functions performed by the machine.

The timing chart (Fig. 23) illustrates graphically the sequence of operation of the major functions performed by the machine of which the indicating mechanism described may form a part. The heavy lines used in this chart illustrate the period and duration of activity or movement of the operating parts while the light line portion of any circle designates the idle condition of the represented function. Sudden breaks in the heavy lines indicate points at which the operating members change their direction of movement.

Starting at 0°, circle 1, which designates the timing of the indicator parts, shows movement of certain of its parts up to 20°. This time is utilized to bring down the indicator supporting and lifting plates 1088 and the previously raised tablets themselves, thus destroying the previous setup and conditioning the indicator section for a new setup. The key locking bar 52 is released at this same time, 0° to 20° (circle 10), to hold all keys locked in either normal or depressed position. From 20° to 35°, circle 2, indicates operation of the differential units related to the special keys to select the proper totalizers, counters, and special indicator tablets according to the transaction, department and clerk keys depressed. From 35° to 45° the slides 370 holding out the totalizer engaging bails 364 are shifted to allow any of the bails, which have a series of notches in the bars 353, 472, 486, and 496 aligned below their cooperating fingers, to engage the related totalizer lifting frames preparatory to lifting them. During the interval from 45° to 60°, as shown by circles 4 and 5, the totalizers are lifted into mesh with the actuators when either a sub total or a reset or grand total is being taken (and indicated). Movement of the actuators to the positions represented by the keys or the selected totalizer under the action of the positive differential mechanism, or by the aid of the spring levers 548, on totaling operations, next takes place between 60° and 155° (circle 7). If an item entering operation is being performed the totalizers are lifted into mesh with the actuators between 155° and 170° (circle 6).

If a reset total is being taken the totalizers will be carried out of mesh with the actuators between 175° to 185° (circle 4) while early during this period the rack detents (circle 9) will move in to keep the racks from jumping and will stay in this position while the racks are being restored. The detents engage the racks very quickly at about 178° before the totalizers are more than half out of mesh. The indicators are lifted slightly at this time, 175° to 185° (circle 1), to permit the detents 1121 to latch their selection bars 1113 and 1114 in position before the amount differential slides move back towards normal.

During the last portion of the operation of the machine other mechanisms are operated to complete their functions. For example the newly selected indicator tablets are lifted by upward movement of the plates 1088, 335° to 360° (circle 1) and are held exhibited behind glass windows at the front and rear of the machine and the depressed keys are released late in the operation, 345° to 360° (circle 12).

RÉSUMÉ

One suitable form of the invention having thus been described in detail the coordination of the several operative features will now be more clearly set out by a brief description of an operation of the indicating mechanism in connection with the operation of the machine as a whole.

Assuming that a customer of the store in which the machine is located has previously purchased a victrola and is about to make a payment of $7.50 an account to clerk B while cashier number 2 is on duty, the machine, in the first place, will be conditioned by the turning of cashier 2's lock 455 (Fig. 1) to designate her responsibility for the items entered. Total controlling levers X and Y (Fig. 21) will be located in their item entering positions. The knobs 714 will have been adjusted at the beginning of the day to indicate the date on certain of the printed records. Upon receipt of the money the cashier will depress the proper amount keys representing $7.50 and also the proper special keys representing the "received on account" transaction, the clerk "B" and the "Victrola" department, all of these keys being held depressed by the detents described. Proper adjustment of one of the cashier's locks and depression of a key in each of the special banks will serve to release the machine for operation by withdrawing the set of four independent locking pawls 589 (Fig. 35) which cooperate with the operating shaft 37.

The main operating parts of the machine may now be turned either by means of a motor or by the hand operated lever 33. Depression of the "received on account" key will have served to shift the slide 306 (Fig. 8) of its bank downwardly a distance of two steps. The slide 306 carries the stud 323 which will have been thus carried down two steps from normal. Similarly the "B" clerk's key will have served to shift its slide 307 upwardly one and one half steps so that the adjacent slide 306 will have been shifted upwardly three steps, thru the gears 311 and 312, thereby carrying its stud 323 up three steps from normal. Depression of the "Victrola" department key will likewise have shifted its slide 307 up one and one half steps and the related slide 306 together with its stud 323 up three steps.

Now upon the operation of the main shaft of the machine the shaft 324 (Fig. 8) together with arms 325 will be rocked clockwise very early to carry the rod 326 and hence the cam plates 329 upwardly. The jaws 331 of the latter cooperating with the several studs 323 will have caused the segments 330 to rock.

Prior to the engaging movement of the totalizers, the differential operating frames 138 (Fig. 2) will begin to rock and through the gearing associated therewith will tend to cause the slides 130 to be moved upwardly and the slides 131 to be moved downwardly. In those banks where no keys have been depressed the slides 130 will be barred from any upward movement by means of the zero stops 120 while the complemental slides 131 will partake of the full nine steps of downward movement, moving segments 1132 and connected indicating mechanism parts correspondingly. In the dollars bank, however, the zero stop will have been raised and the slide 130 will be permitted to move upwardly 7 steps until the lug 134 engages the depressed 7 key while the complemental slide 131 will move downwardly 2 steps until its lug 135 engages the opposite side of the 7 key, whereby the corresponding segment 1132 and connected parts are moved 2 steps. Similarly the dimes slide 130 will move upwardly 5 steps while its complemental slide will move downwardly 4 steps. Subsequently, after the selected totalizers have been lifted into mesh with the actuators which have been shifted to the same extents as the slide 130, the frames 138 will be restored and will return the actuators 162 as well as the slides 130 and 131 to their normal positions.

The operation of the indicator mechanism for designating which of the amount and special keys have been depressed is as follows: early in the operation of the machine the shaft 1102 (Fig. 18) is rotated by the connections from the sector 524 shown in Fig. 3, to lower the frames or lifting plates 1088 together with the previously exposed tablets. As these plates approach their lowered positions the pins 1154 on pawls 1121 engage the upward extensions 1153 of the slides 1147 and thereby release the selecting slides 1114 which are then shifted toward the left (Fig. 18) by their springs 1117. Now upon continued operation of the machine the special key differentials are adjusted in the manner indicated and as the segments 330 (Fig. 8) are rocked rollers 1135, carried thereby, cooperate with the cam slots in the members 1137 which through the segments 1134, pinions 1142 and slides 1147 serve to readjust the selecting slides 1114. Next as the amount differentials are operated and the complemental slides 131 (Fig. 2) are shifted toward the front the pins 1128 thereon, cooperating with the extensions of segments 1132, will cause the latter to rotate the corresponding pinions 1142 and sleeves 1156 and 1160 associated with the dollars and dimes banks (having reference to that $7.50 amount previously specified) to adjust the related slides 1147. These by cooperation of pins 1152 with the overturned lugs 1125 and 1126 of the selecting slides 1114 and 1113 will shift the latter until the lugs 1125 and 1127 are beneath the fingers 1099 of the new indicators to be lifted. At a suitable point in the operation of the machine, i. e., after the differential mechanisms have come to rest, the plates 1088 are lifted slightly to disengage the pins 1154 of pawls 1121 from the shoulders 1153 so that the selecting slides 1114 may be held in their new positions while the differential mechanisms are subsequently restored to normal. At a later point in the operation the plates 1088 will be lifted further to fully expose the selected indicators. Similarly in total taking the indicating mechanism will be controlled to indicate the amount of the total and the totalizer from which said total was taken.

While one admirable form of the present invention disclosing its many novel and improved features has been disclosed herein, it is to be understood that numerous modifications may be made in the specific constructions illustrated and described without departing from the spirit or scope of the invention. Not only is it contemplated that changes may be made in the specific mechanisms provided for the accomplishment of various functions but if desired parts may be omitted or rearranged to bring about variations in the results effected. It is not desired to be limited other than by the scope of the claims which follow.

What I claim is:

1. In a machine of the class described the combination of a set of indicator tablets, a tablet selecting device formed with teeth, a main operating mechanism, positioning means operated by the main operating mechanism and acting on the selecting device for positioning the selecting device differentially, a latch engageable with said teeth on said selecting device for holding the selecting device in set position, means controlling the extent of movement of the positioning means, and means operated by the main operating mechanism for moving the selecting device and selected tablets out of exhibiting position and disengaging the latch, said means being then moved slightly in the opposite direction to re-engage the latch and finally serving to move the selecting device and newly selected tablet to exhibiting position.

2. In a machine of the class described the combination of a set of indicator tablets, a tablet selecting device formed with teeth, a main operating mechanism, positioning means operated by the main operating mechanism and acting on the selecting device for positioning the selecting device differentially, a latch engageable with said teeth on said selecting device for holding the selecting device in set position, means controlling the extent of movement of the positioning means, and means operated by the main operating mechanism for moving the selecting device and selected tablets out of exhibiting position and thereafter disengaging the latch, means operated by the main operating mechanism to thereafter re-engage the latch and means operated by the main operating mechanism for finally moving the selecting device and newly selected tablet to exhibiting position.

3. In a machine of the class described, the combination of a set of indicator tablets, of a differentially shiftable selecting device for the tablets, a latch for normally holding the selecting device in the position to which it has been shifted, a main operating mechanism, positioning means operated by the main operating mechanism for positioning the selecting device differentially, manipulative means controlling the extent of movement of the positioning means, and vertically movable means operated by the main operating mechanism for moving the selecting device and tablets out of exhibiting position, means on said latch engageable with said positioning means when said operating means is moved to its lowermost position so that the latch will be rocked and disengaged from the selecting device, said means being subsequently moved slightly upward to re-engage the latch and finally serving to move the selecting device and newly selected tablet fully upward to exhibiting position.

WILLIAM S. GUBELMANN.